United States Patent [19]

Wolfe et al.

[11] 3,759,227

[45] Sept. 18, 1973

[54] BELT TYPE CATTLE FEEDER

[75] Inventors: Walter W. Wolfe, Mound; Jack D. Messner, Wayzata; Eivind M. Rambo, Maple Plain, all of Minn.

[73] Assignee: Van Dusen & Co., Inc., Wayzata, Minn.

[22] Filed: Dec. 20, 1971

[21] Appl. No.: 209,645

[52] U.S. Cl............. 119/52 B, 119/56 R, 198/188
[51] Int. Cl............................................. A01k 5/02
[58] Field of Search................... 119/51.11, 52 AF, 119/52 B, 56 R; 198/185, 188

[56] References Cited
UNITED STATES PATENTS 3,306,261  2/1967  Purdy................................. 119/56
3,672,334  6/1972  Scheppele......................... 119/52 B Primary Examiner—Hugh R. Chamblee
Attorney—Ralph L. Dugger

[57] ABSTRACT

A belt type cattle feeder having a storage hopper at one end, a movable endless belt for moving material from said hopper, and a transversely movable sweep member that passes laterally across the belt when a windrow of cattle feed has reached a preselected position in relation to the hopper, and to thereby push the material from the belt into a feed bunk or a feeding location.

12 Claims, 10 Drawing Figures

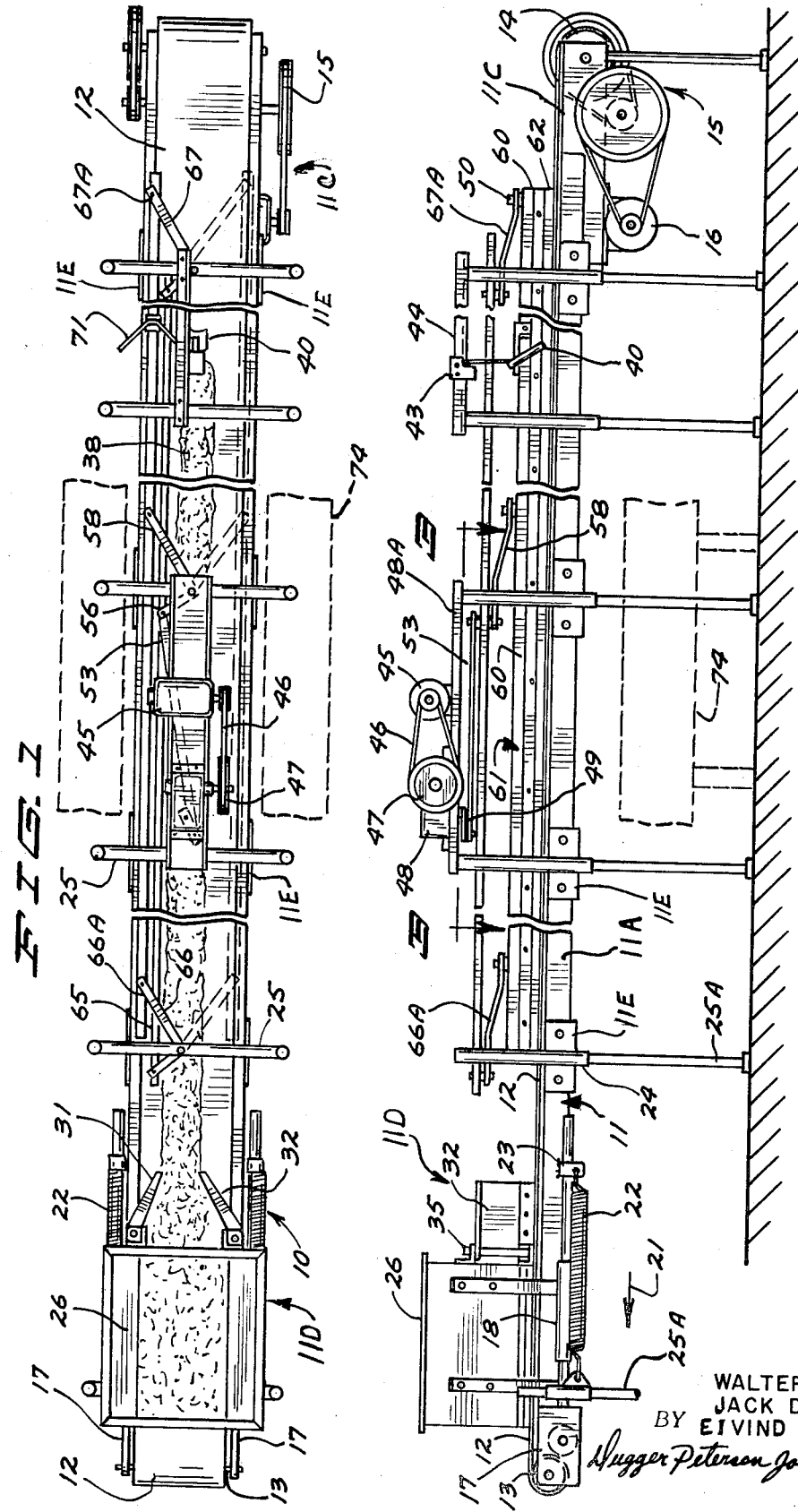

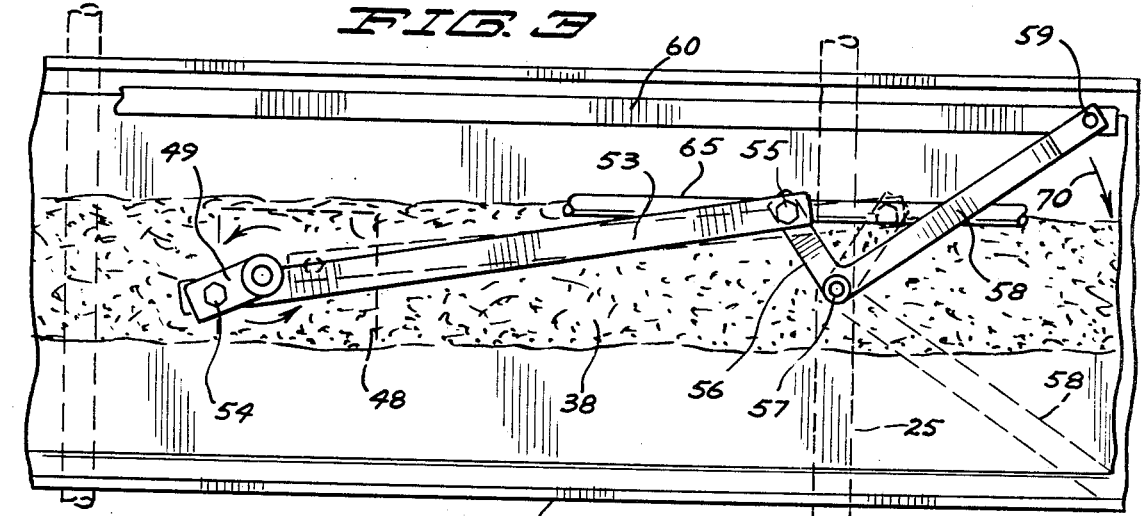
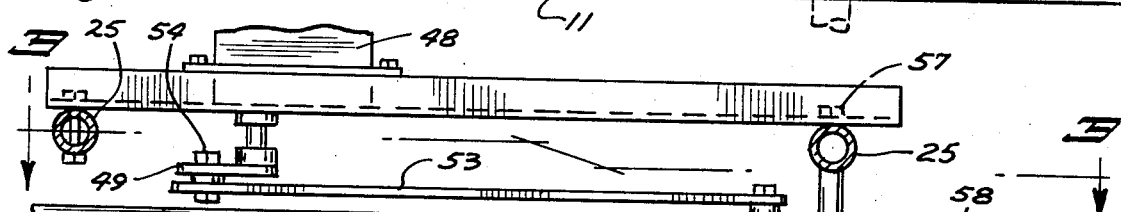
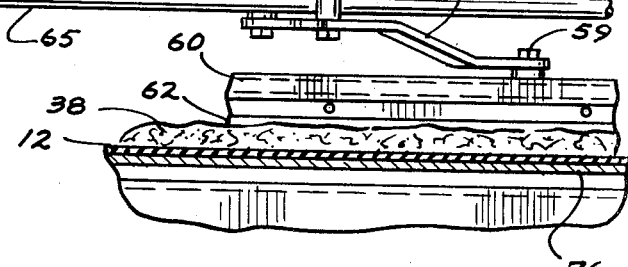
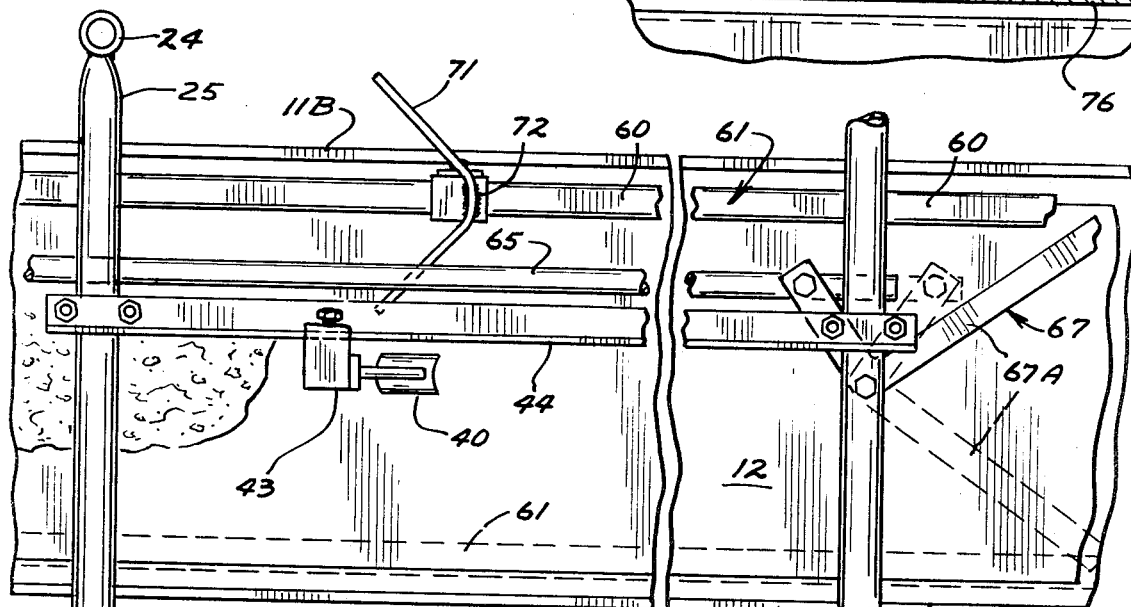

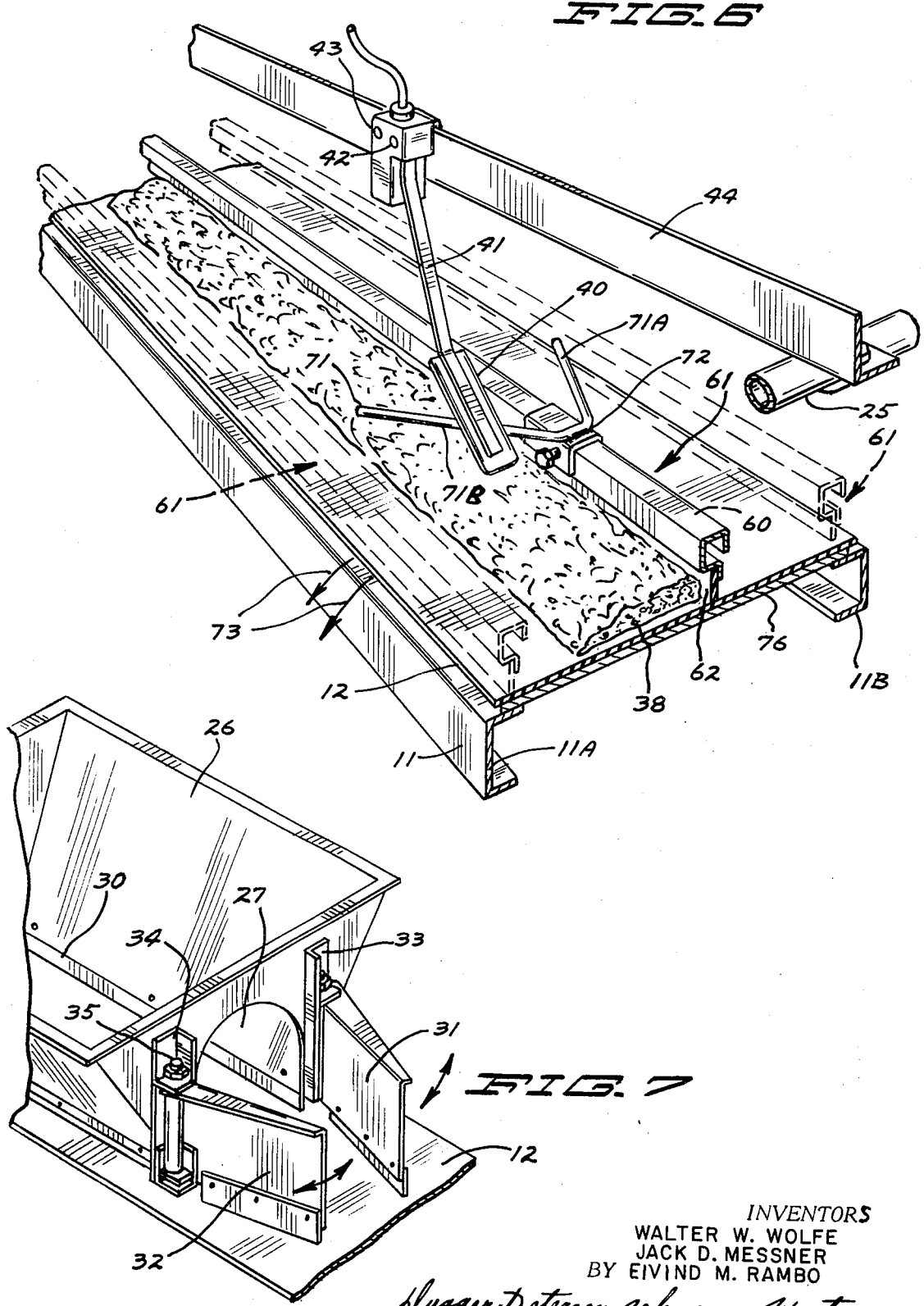

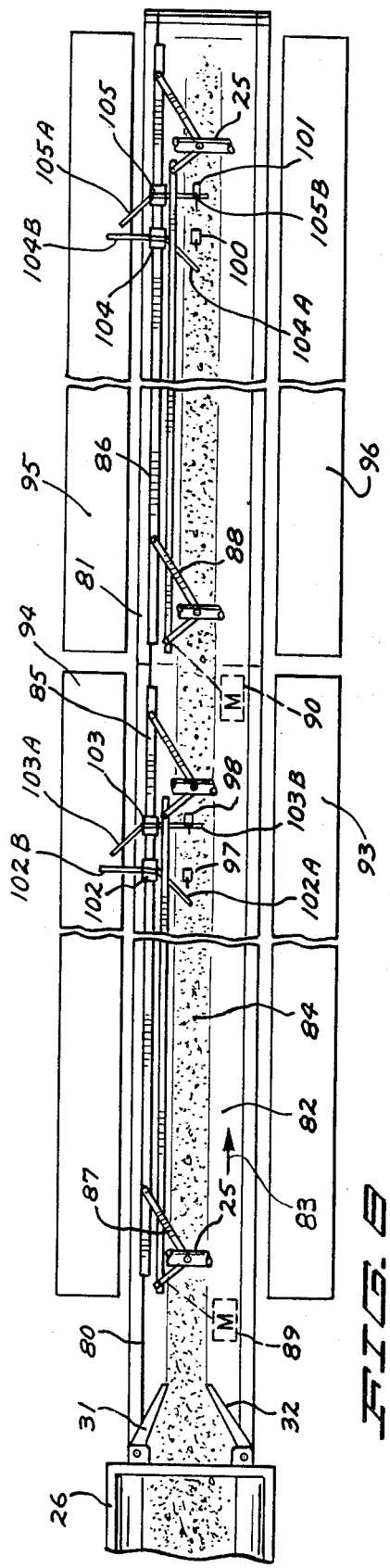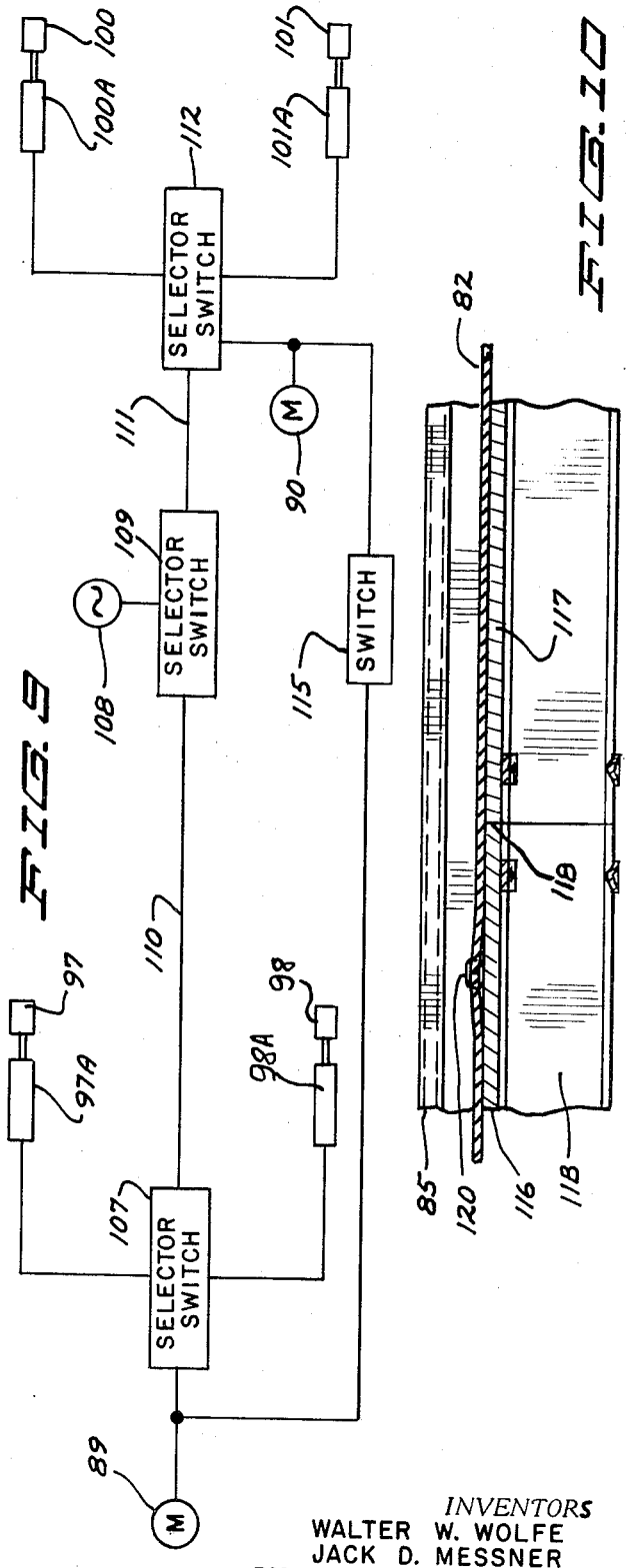

3,759,227

BELT TYPE CATTLE FEEDER

BACKGROUND OF THE INVENTION

1. Field of the Invention

The present invention relates to belt type feeders for feeding cattle.

2. Prior Art.

In the prior art there have been a number of belt type feeders used in the prior art. For example, U.S. Pat. No. 3,522,876 to C.A. Purdy shows a belt with a plow for removal of feed from the belt. Transverse unloading movement of a device across a belt feeder is shown in U.S. Pat. No. 3,173,534.

SUMMARY OF THE INVENTION

The present invention relates to a belt type feeder which removes feed from a hopper and having a sweep mechanism that selectively moves laterally across the moving belt to remove material from the belt and push it off one side of the belt. The sweep mechanism can be cycled from one side to the other to feed on the opposite sides of the belt. The hopper is provided with guides for shaping the material carried out of the hopper by the belt into a narrow windrow that easily actuates the controls for the sweep mechanism that clears the belt.

In operation, particulate feed is pulled out of the hopper by the belt, narrowed down into a windrow, and when the windrow strikes a paddle at a desired location, the switch is actuated, operating mechanism to move the sweep across the belt and laterally remove the feed that is on the belt at that time.

A plurality of sections can be operated sequentially and selectively to feed several different pens of cattle. The controls used permit individual feeding of several pens of cattle selectively.

BRIEF DESCRIPTION OF THE DRAWINGS

FIG. 1 is a top plan view of a belt cattle feeder made according to the present invention;

FIG. 2 is a side elevational view thereof;

FIG. 3 is a fragmentary enlarged sectional view taken as on line 3—3 in FIG. 2 illustrating the typical mechanism for operating a cross moving sweep member of the present invention;

FIG. 4 is a side elevational view of the device of FIG. 3;

FIG. 5 is a top plan view of a paddle switch actuating member used with the present invention;

FIG. 6 is a perspective view of the paddle switch and actuating member partially moved toward one side of the unit;

FIG. 7 is a perspective view of windrow guide wings used in combination with the outlet of the hopper of the feeder of the present invention;

FIG. 8 is a top plan view of a feeding layout used for selectively placing feed into a plurality of different feed bunks or cattle pens, and showing a plurality of the belt feeder sections connected together;

FIG. 9 is a schematic representation of a typical electrical layout for operating the device of FIG. 8; and FIG. 10 is a fragmentary sectional view showing a typical junction between the belt support members when a plurality of sections are connected together, and which prevents the tearing of belts.

DESCRIPTION OF THE PREFERRED EMBODIMENT

A cattle feeder illustrated generally at 10 comprises a main support frame 11 and an endless belt illustrated at 12 that is mounted over an idler roller 13 at the one end thereof, and over a drive roller 14 at the other end. The drive roller is driven through a suitable belt and pulley drive arrangement 15 from an electric motor 16 mounted onto an end frame 11C attached to frame 11. The roller 13 is rotatably mounted onto a pair of brackets 17,17 that include elongated tubes which are slidably mounted in suitable guide tubes 18,18 attached to the side walls of the frame 11. The brackets 17, and the roller 13 are urged in direction as indicated by the arrow 21 by tension springs 22 that are attached between collars 23 on the brackets 17 and to the frame of the feeder so that the belt 12 is kept under tension by the spring force of springs 22.

The frame 11 is made up of a pair of side rails 11A and 11B, that are spaced transversely apart, and are held together with suitable cross members. The frame assembly is supported with suitable brackets 24 by posts 25A and these brackets permit adjusting the feeder in height as desired.

The brackets 24 extend upwardly above the level of the belt 12, and cross members 25 join the upper ends of the brackets 24. The cross members 25 are used for supporting other mechanisms, as will be explained.

The feed hopper 26 is mounted at the end of the feeder unit adjacent the idler pulley 13, and has an outlet opening 27 (see FIG. 7) that is centered above the belt 12. The hopper 26 actually has flexible lip members 30 that ride along the belt 12 as it moves underneath the hopper, and material in the hopper is pulled out through the opening 27 as the belt travels from the idler end toward the drive pulley 14 under the drive of the motor 16.

A pair of windrow forming wings 31 and 32, respectively, are mounted adjacent the sides of the opening 27 on brackets 33 and 34, respectively. Each of the wings 31 and 32 is attached with a separate adjustable or tightenable spindle 35 that passes through and hingedly connects the wings to the brackets 33 and 34 respectively. The spindles 35 can be tightened to retain the angular position of the wings 31 and 32 at a desired position with respect to the hopper so that the opening between the ends of the wings 31 and 32 can be adjusted to be relatively narrow, or widened out as desired so that windrow of material or feed coming through the opening 27 can be formed into a nice narrow relatively straight sided windrow to prevent material from spilling out over the lateral edges of the belt unintentionally.

This narrow windrow, which is indicated at 38 (FIG. 6), is carried out along the top section of the belt as the belt 12 is driven in direction away from the hopper, underneath the cross frame members 25 until it strikes an actuator paddle or blade 40 that is mounted onto an arm 41 that in turn is pivotally mounted about an axis that is indicated at 42 inside a switch housing 43. The arm 41 is spring loaded and urged by a spring in direction opposite from the direction of movement of the belt 12, and a stop on the switch housing holds the paddle in its normal position. The switch housing is adjustably mounted onto a support member 44 that in turn is mounted between a pair of the cross members 25, and the switch housing includes a limit switch that operates to control an electric motor 45. When the paddle 40 is raised by the windrow 38, the limit switch inside the housing 43 is actuated to close the circuit driving the motor 45. As seen in FIGS. 1 and 2, the motor 45 has a sheave on its output shaft which drives a belt 46, and which in turn drives a pulley 47 on a suitable gear box 48. The gear box 48 has a crank arm 49 on its output shaft. The crank arm 49 is connected with a pin 54 (FIGS. 3 and 4) to a suitable driving link 53. Link 53 is pivotally connected at 55 to one leg 56 of a bell crank or lever assembly. The bell crank assembly is pivotally mounted as at 57 to a support extending from one of the cross members 25. The bell crank has a second leg 58 that in turn is pivotally mounted as at 59 to an elongated frame 60 for a feeder sweep 61. Sweep 61 includes the longitudinally extending frame member 60, and a flexible lip member 62 that engages the belt 12 while the belt is moving.

The arm 56 of the bell crank directly driven by link 53 is also connected to a drag link 65 that extends along the feeder length, and the drag link 65 is connected to a desired number of individual bell cranks for operating the sweep. As shown, the drag link is connected to bell cranks 66 and 67. The bell cranks 66 and 67 are also pivotally mounted to cross member 25 and have legs 66A and 67A respectively, that are pivotally mounted to the frame 60 for the sweep assembly 61. The number of bell cranks utilized is selected to insure that there is sufficient control on the sweep to move it laterally when the motor is operated.

When the motor 16 is energized, the crank arm 49 starts to turn, and the bell crank arm 56 is moved toward its dotted line position, and of course the arm 58 is also moved toward its dotted line position generally as indicated by the arrow 70, (see FIG. 3). As the crank arm 49 rotates, the movement of the bell crank moves the sweep assembly 61 laterally across the belt 12 as the belt is moving. The sweep assembly 61 is shown partially across the belt in FIG. 6. It should be noted then soon after the sweep starts to move laterally, the paddle will be lifted by a paddle guide rod 71 that is adjustably mounted with a bracket 72 to the top of the frame 60 for the sweep assembly 61. The bracket is slidable along frame 60 and may be retained in desired position with a set screw.

The switch operating the motor 45 will be held on by guide 71 so that the motor 45 will run as the sweep starts to engage the windrow 38. The windrow 38 will hold paddle 40 upwardly against the spring load until the guide rod engages the paddle. As the windrow 38 is moved laterally by the sweep 61 the guide rod 71 will guide the paddle upwardly and over the frame member 60, all the time holding on the switch to the motor 45 and to keep the sweep moving laterally across the belt 12. The paddle 40 pivots up so that it won't interfere with the frame member 60. Then the sweep 61 goes all the way across the belt, and the feed in the windrow 38 will drop down over the edge of the belt as shown by the arrows 73 so that the feed drops down into suitable feed bunks that are positioned below the unit. For example, a portion of a feed bunk for cattle is dotted in FIGS. 1 and 2 and indicated at 74. The bunks can be positioned on opposite sides of the unit as shown in dotted lines, so that two pens of cattle can be fed. In the first form of the invention the guide 71 can be made so that the guide end portions for example 71A and 71B are of suitable length for the desired operation.

If it is desired to feed on both sides of the feeder or belt, the guide 71 is adjusted so that the paddle 40 will drop off the guide 71 and stop the motor 45 with the sweep 61 on the opposite side of the belt each time it is actuated. For example, in FIG. 6 when the sweep 61 moves all the way over to the side of the belt adjacent arrow 73, the paddle 40 drops off the guide end portion 71A, opening the switch for motor 45 and stopping the motor. Then the sweep would stay in its dotted line position as shown until another windrow of feed was moved by the belt 12 to position to lift the paddle 40 to close the switch and energize motor 45. The sweep 61 would then move in opposite direction across the belt as the motor 45 ran and guide end portion 71A would engage the paddle 40 and lift it up over the sweep 61, and the windrow of feed that had actuated the paddle for this cycle of operation would be dropped off the opposite side of the belt into a feed bunk for feeding cattle on the opposite side of the feeder. Thus, alternately the feeding would be done on opposite sides of the feeder.

If feeding to only one side is required, then the guide 71 is adjusted so the guide portion 71A for example keeps the paddle 40 lifted even when the sweep is in dotted position, and the motor 45 would continue to run and would move the sweep back to its original position. The paddle would drop off portion 71B of the guide and stop the motor until another windrow of feed actuated the paddle.

By having the hopper wings 31 and 32 properly positioned, the windrow 38 of feed will be piled sufficiently high, and with sharp defined edges so that there won't be any spillage over the lateral edges of the belt 12 as the belt travels. It should also be noted that the belt 12 moves along a support floor 76 that extends between the frame members 11A and 11B. The support floor 76 is slightly narrower than the belt 12 so that any feed spilling off will not be carried underneath the belt or the frame members. This prevents material from collecting beneath the belt and building up to cause malfunction during operation.

Referring to FIG. 8, a part schematic representation of a multiple feed lot feeding layout is shown. In this instance, the belt feeder sections are indicated at 80, and 81, and utilize feed from the hopper 26 which include the windrow forming wings 31 and 32 on the outlet thereof as in the previous form of the invention. A conveyor belt indicated at 82 is mounted on rollers and driven as explained before, in direction as indicated by the arrow 83, and pulls out a windrow of feed 84 along the belt.

The sweep members 85 and 86, that operate in the same manner as the previous sweep member described are mounted on suitable supports. These sweep members are controlled through bell cranks 87 and 88 driven by separate motors 89 and 90, respectively. The motor drive is shown schematically, but the entire drive for the sweep members 85 and 86 is the same as that previously explained. Each sweep member may be constructed as previously described, and the individual sweep members are usually made up in standard lengths. Thus when the feeder sections are connected together separate, standard length sweeps are used.

In the form shown, there are at least two control paddles for controlling movement of each of the sweeps 85 and 86. These control paddles are shown only schematically and are operated so they will cause the sweeps to be selectively operated so that the windrow of feed indicated at 84 can be deposited into any one of four feed bunks, 93, 94, 95 and 96 respectively. These feed bunks represent four separate feeding pens so that four different groups of animals can be fed, each being selectively fed a different ration. The control paddles are indicated at 97, and 98 for the sweep section 85, and paddles 100 and 101 are used for controlling the sweep section 86. Again, the sweep sections 85 and 86 are made so that they will sweep or move across the belt as previously explained to remove the windrow of feed to either side of the belt, when they are actuated and powered.

Paddle 97 is guided and lifted by a guide rod member 102 that is mounted onto the sweep 85 in the same manner as the previously described guide rod 72, and guide rod 102 has one end portion 102A that slopes toward the hopper 26, and a second end portion 102B that runs at substantially right angles to the longitudinal axis of the sweep 85. The paddle 98 is guided by a guide rod 103 that has a tapered or rear sloping end portion 103A on an opposite side of the sweep 85 from the sloping portion 102A, and a straight section 103B that runs at right angles to the sweep 85 on an opposite side from the straight rod portion 102B.

Likewise, the controls for sweep 86 includes a guide rod 104 that is for paddle 100. The guide rod 104 has a slanted portion 104A on one side of the sweep 86, and a straight portion 104B that extends at right angles to the longitudinal axis of sweep 86 on the opposite side thereof from portion 104A. The paddle 101 is engaged by guide rod member 105 that includes a tapered portion 105A, that slants rearwardly back toward the hopper as shown, and a rod portion 105B that extends at right angles to the longitudinal axis of the sweep 86, and is on the opposite side of the sweep from the rod portion 104B.

Referring to FIG. 9, a simplified schematic of the electrical controls utilized with the device of FIG. 8 is shown. The paddles 97 and 98 are shown schematically, and it should be pointed out that these paddles are mounted for pivotal movement on switches in the same manner as the paddle shown in FIGS. 1–7. The paddle 97 controls a paddle switch 97A, paddle 98 controls a paddle switch 98A, paddle 100 controls a paddle switch 100A, and paddle 101 controls a paddle switch 101A. The paddle switches are simply on and off switches, that are on when the paddles are lifted upwardly away from the surface of the belt 82 by the windrow 84, or when lifted sufficiently by their respective guide rods. The switches 97A and 98A are connected into a selector switch 107 that connects, alternately, and selectively, either the switch 97A or the switch 98A to control the motor 89 that powers the sweep 85. The power comes from a source 108, through a selector switch 109 that will direct power either along a line 110, or a line 111. The line 110 then may be selectively energized through the selector switch 109, and either the switch 97A or 98A will then control power to the motor 89.

Assuming that the feed ration coming from the hopper is to be fed only to the feed bunk 93, the selector switch would be set so that the paddle 97 and the switch 97A would control the operation of the motor 89. It should be pointed out that the paddles 97 and 98 could be positioned closer to the end of the sweep 85, but for the sake of illustration, they are positioned as shown. Assuming that a feed windrow 84 is carried to the paddle 97, the windrow will lift the paddle 97 closing the switch 97A and with the selector switch 107 properly positioned energize motor 89. This will cause the sweep 85 to be driven back across the belt from the solid line position. Only sweep 85 will be driven, and the windrow of feed will be pushed off into the bunk 93. When the sweep moves toward the center of the belt the paddle 97 will be lifted by the guide rod section 102B of the guide rod 102 and will be held upwardly to its on position even when the sweep 85 reaches position at the opposite edge of the belt 82 adjacent feed bunk 93. The motor 89 will keep running because paddle 97 is lifted, and return the sweep to its position shown in solid lines. The paddle 97 will be permitted to lower to an off position as it slides along guide rod portion 102A. Then, when a windrow of feed again reaches the paddle 97, another ration of feed will be moved into the bunk 93, as long as the selector switches continue to be set as described. Of course, the selector switches can be relays which control suitable contacts for the actual switches.

If feeding into the bunk 94 is desired, the selector switch 107 is moved to position wherein the paddle 98 and switch 98A controls movement of the sweep 85. Switch 97A is cut out of the circuit. The normal rest position of the sweep 85 when controlled by switch 98A is on the opposite side of the belt from that shown in solid lines because the end portion 103B of the guide rod 103 is lifting the paddle 98 to close switch 98A in the solid line position of FIG. 8. The sweep 85 immediately moves over to the opposite side of the belt 82 when switch 98A is placed into the circuit to control motor 89 with the sweep 85 on the proper side of belt 82. When the feed windrow is moved past paddle 98, (paddle 97 is cut out of circuit) the paddle 98 will lift, and the switch 98A is closed moving the sweep laterally across the belt to push the feed windrow into bunk 94. The tapered guide rod portion 103A picks up the paddle 98, and switch 98A is held on by guide rod portion 103B until the sweep 85 is returned to the opposite side of the belt from that shown in solid lines.

If it is desired to feed only into the bunks 95 or 96, then the selection switch 109 from the main power source is used to cut out the power to selector switch 107, and to energize a selector switch 112 through line 111. With the paddle switches 97A and 98A now out of the circuit, the windrow 84 will be carried by the belt past the sweep section 85 and toward the end of the conveyor belt 82 by sweep section 86. The paddles 97 and 98 are lifted, but no action is initiated. Assuming then that the feed is to be deposited in the bunk 96, the selector switch 112 is placed into position to energize the switch 100A actuated by paddle 100. When windrow 84 has lifted the paddle 100, switch 100A is closed, and motor 90 is energized through selector switch 112 and from the power source 108. Then the sweep 86 is moved laterally across the belt by motor 90, moving the aligned section of the feed windrow on the belt 82 into the bunk 96. The guide rod portion 104B keeps the paddle 100 lifted and the switch 100A energized until the sweep has moved back to its solid line position as shown on FIG. 8, at which time the paddle 100 is dropped, switch 100A is opened and motor 90 stops until another windrow of feed engages paddle 100.

To feed into bunk 95, the selector switch 112 is set to connect switch 101A actuated by paddle 101 into the circuit. Then when this is done, if the end portion 105B of the guide rod 105 is in position as shown in FIG. 8, the switch 101A would be closed immediately energizing motor 90 until the sweep 86 moves to the opposite side of the belt 82 from that shown in solid lines, where the motor 90 is shut off and the sweep 86 remains until a feed windrow lifts paddle 101 and closes switch 101A. When this switch 101A is again closed the sweep 86 is moved by the motor 90 laterally across the belt, pushing any windrow of feed on the belt 82 into the bunk 95, and the end 105B would keep the switch 101A closed by keeping paddle 101 lifted until the sweep went back to the opposite side of the belt from the solid line position shown.

Additionally, if desired, a cut out switch 115 can be used for connecting the motor 89 in parallel with motor 90, and at the same time that motor 90 is energized motor 89 would also be energized this means, for example, if both bunks 93 and 96 were to be fed the same ration, the paddle 100 and switch 100A would control both motors 89 and 90. Then whenever the sweeps moved, they would both move in unison, and feed would drop into the two bunks on the same side of the belt 82 at the same time.

Thus it can be seen that by connecting together various sections of this belt feeder assembly to increase the length of the belt feeder assembly as desired, and using individual sweep sections such as 85 and 86, any number of bunks can be selectively fed. Three or more sections of feeders (each with a separate sweep) can be installed, or even more. By having proper selector switches, or automatic programming controls, the individual feed lots an be selectively fed. This means that different rations can be fed to different feed lots of cattle in the different pens represented by the feed bunks shown.

The programmer can be of any desired construction, and can be sequential if desired. If automatically controlled, simple relay controls can be used so that the bunks would be selectively and sequentially fed. If sequential feeding is carried out, the feed bunks closest to the hopper should be the last to be fed so that there is no windrow of feed remaining on the belt when the feeding operation is completed. Further, of course the belt can be stopped, prior to the time that the operation of the sweeps is shut down so that the blts are swept clean by the sweeps at the end of each feeding cycle. If desired, also, the hopper outlet can be closed off before the belt 82 is stopped to remove all feed from the belt. If desired, normal or direct acting override switches may be used to run motors 89 and 90.

In FIG. 10, a showing of a simplified manner of joining support boards for the belt of the feeder when two feeder sections are arranged end to end. The use of boards or similar material keeps the belt lacing from catching on the connections between the support boards. As shown, the frame member 11B is supporting a first board member 116, and a second board member 117. The belt 82, which is the long belt used when two or more feed sections are connected together rides on top of these support boards. The junction 118 between the two boards 116 and 117 is a source of trouble if the supports 116 and 117 are made of metal as is the usual case. However if they are made of plywood, or similar soft material, the belt lacing indicated at 120 will merely wear in along the junction 118 and will not hook onto the ends of the supports 116 and 117 and tear out as they will with metal supports 116 and 117. Therefore, the use of wood or similar soft material for the junction and the board supports on the belt enhances the belt life, and makes it to have joined belt feeder sections so that the stock lengths of feeder can be much shorter than the actual total length needed, and then they are merely butted together. The belt lacing will chip away or wear away any irregularities at the junction 118 without tearing the lacing from the belt.

The drag link-bell crank drive for the sweeps also insures that the sweep operation will be reliable and safe.

The adjustable mounting of the switch box 43 permits moving the switch box 43 longitudinally along support 44 to different positions so that the proper action of the sweep in relation to the feed bunks being used is achieved. The guide 71 and bracket 72 also can be longitudinally adjusted to operate the paddle switch when the switch is moved. The support 44 is movable to different frame cross members as well. In this manner an end section of the feeder may be rendered ineffective, if a short bunk is to be fed, for example. In other words, the sweep may be actuated when the windrow is only a short distance from the hopper, if desired.

The paddle switchs 97A, 98A, 100A and 101A also are adjustably mounted for longitudinal movement, as are the corresponding guide rods.

The basic belt feeder assembly is made into sections with the side frame members 11A and 11B joined together with plates 11E. The plywood sections are butted together as shown in FIG. 10.

The assembly is made up of a standard hopper section 11D that is standard on all feeders, drive section 11C which mounts motor 16 and drive components, and then adding in standard frame sections which are shown between the hopper and drive sections. The feeder belt is of course made to the proper length.

For example in FIG. 8, the standard drive end section 11C, and the standard hopper end section 11D of FIG. 1 are used, but the number of intermediate frame sections is different.

The types of bunk utilized can be any desired configuration, and of course the device can be provided with windboards and suitable housings to shield the belt from inclement weather. The unit will work with practically any type of feed ration or forage crop that can be carried by a belt conveyor having a surface across which the sweep can operate.

What is claimed is:

1. A feeding device comprising a frame, a storage hopper, an endless member conveying material from said storage hopper through an opening, wing guide means adjacent said opening to form a windrow on said endless member on an upper surface thereof as material is removed from said hopper, an elongated sweep member mounted adjacent the upper surface of said endless member and extending along the endless member, means to move said sweep member laterally to the direction of movement of said endless member across said endless member, and actuating means for said means to move said sweep member laterally comprising a sensing member engagable by said windrow when the windrow has reached a preselected position, power means responsive to the sensing member to move said sweep from one position laterally across said endless member.

2. The combination as specified in claim 1 and adjustable means to permit adjusting the distance between said wing guide means on opposite sides of said opening.

3. The combination as specified in claim 1 wherein said sensing means comprises a paddle pivotally mounted with respect to said frame and positioned normally slightly above said endless member, a windrow of material carried by said endless member causing said paddle to pivot upwardly away from said endless member to thereby actuate the means moving said sweep member.

4. The combination as specified in claim 3 and guide means on said sweep member to engage said paddle and lift said paddle to permit said sweep member to pass underneath said paddle as said sweep member moves laterally.

5. The combination as specified in claim 4 wherein said endless member comprises an endless belt member.

6. The combination as specified in claim 5 wherein said frame includes a support panel for said belt member, said support panel being narrower than the belt member so that said belt member extends laterally outwardly beyond said support panel for short distances on opposite sides of said support panel.

7. The combination as specified in claim 5 and idler pulley means mounting one end of said belt member, and spring means urging said idler pulley means to exert a tension in said belt member during operation of said belt member.

8. The combination as specified in claim 5 and means on said guide means to engage said paddle and keep said power means energized for a preselected portion of a cycle of operation.

9. A feeding device comprising a frame, a storage hopper for material to be fed, an endless belt member operable to remove material from said hopper in a windrow on said belt, at least two sweep members operating along separate portions of the belt, means to mount said sweep members for movement laterally of said belt to remove material carried by said belt, separate power means to drive each of said sweep members, control means responsive to windrow position to energize said power means, said control means including means to permit selection of individual operation of said sweep members in response to said control means, and means to selectively operate each sweep member to move across the belt and to return to its starting position each time the control means is energized for a cycle of operation.

10. The feeding device of claim 9 wherein said control means includes means to position each sweep member along a selected side of the belt at the start of each sweep cydle.

11. A feeding device comprising a frame, a storage hopper for material to be fed, an endless belt member operable to remove material from said hopper in a windrow on said belt, a sweep member mounted on said frame above said belt, means to mount said sweep member for movement laterally of said belt to remove material carried by said belt, power means to drive said sweep member, control means to energize said power means in response to position of said windrow in relation to said frame, said control means including a first switch means and a second switch means selectively connectable to said power means, said first switch means energizing said power means to move said sweep member across the belt and to return substantially to its starting position adjacent a first side of said belt each time the control means is energized and said second switch energizing said power means to move said sweep across said belt and return to its starting position adjacent a second side of said belt each time the control means is energized.

12. The combination of claim 11 wherein each of said switch means includes a depending paddle, and separate guide means for each paddle to lift the paddle and keep the respective switch means energized when the respective switch means is on a side of said belt opposite from its starting position side.

* * * * *